United States Patent
Neufeld et al.

(10) Patent No.: US 7,240,201 B2
(45) Date of Patent: Jul. 3, 2007

(54) METHOD AND APPARATUS TO PROVIDE SECURE COMMUNICATION BETWEEN SYSTEMS

(75) Inventors: E. David Neufeld, Magnolia, TX (US); Michael F. Angelo, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 10/632,500

(22) Filed: Aug. 1, 2003

(65) Prior Publication Data

US 2005/0027987 A1     Feb. 3, 2005

(51) Int. Cl.
*H04L 9/00* (2006.01)
*H04L 9/32* (2006.01)

(52) U.S. Cl. .......................... 713/168; 713/181; 726/2

(58) Field of Classification Search ........ 713/168–170, 713/176, 181; 726/27, 30, 2
See application file for complete search history.

(56) References Cited

U.S. PATENT DOCUMENTS

| | | | |
|---|---|---|---|
| 5,101,492 A | 3/1992 | Schultz et al. |
| 5,159,533 A | 10/1992 | Kuang |
| 5,175,670 A | 12/1992 | Wang |
| 5,224,019 A | 6/1993 | Wong et al. |
| 5,227,954 A | 7/1993 | Twigg |
| 5,249,279 A | 9/1993 | Schmenk et al. |
| 5,271,152 A | 12/1993 | Murphy |
| 5,331,646 A | 7/1994 | Krueger et al. |
| 5,363,273 A | 11/1994 | Ma |
| 5,408,644 A | 4/1995 | Schneider et al. |
| 5,440,716 A | 8/1995 | Schultz et al. |
| 5,490,342 A | 2/1996 | Rutterman et al. |
| 5,522,065 A | 5/1996 | Neufeld |
| 5,592,648 A | 1/1997 | Schultz et al. |
| 5,668,971 A | 9/1997 | Neufeld |
| 5,737,744 A | 4/1998 | Callison et al. |
| 5,748,888 A | 5/1998 | Angelo et al. |
| 5,748,940 A | 5/1998 | Angelo et al. |
| 5,778,070 A | 7/1998 | Mattison |
| 5,822,184 A | 10/1998 | Rabinovitz |
| 5,844,986 A | 12/1998 | Davis |
| 5,848,418 A | 12/1998 | de Souza et al. |
| 5,850,559 A | 12/1998 | Angelo et al. |
| 5,859,911 A | 1/1999 | Angelo et al. |
| 5,887,131 A | 3/1999 | Angelo |
| 5,892,906 A | 4/1999 | Chou et al. |
| 5,923,754 A | 7/1999 | Angelo |

(Continued)

OTHER PUBLICATIONS

Angelo et al., "Method and Apparatus to Provide Enhanced Computer Protection," U.S. Appl. No. 09/540,697, filed Mar. 31, 2000.

(Continued)

*Primary Examiner*—Hosuk Song (57) ABSTRACT

The disclosed embodiments relate to method and apparatus for providing computer security system. The method may include calculating a hash value of an operation at an administrative system. The signed hash of the operation may be created in the administrative system. The signed hash may be received at the managed system. The managed system may validate the signed hash by using a stored reference hash. Upon determining if the signed hash is valid, the managed system may execute the operation that corresponds to the signed hash.

23 Claims, 7 Drawing Sheets

U.S. PATENT DOCUMENTS

| | | |
|---|---|---|
| 5,944,821 A | 8/1999 | Angelo |
| 5,949,882 A | 9/1999 | Angelo |
| 5,953,422 A | 9/1999 | Angelo et al. |
| 5,955,722 A | 9/1999 | Kurz et al. |
| 5,960,084 A | 9/1999 | Angelo |
| 5,974,250 A | 10/1999 | Angelo et al. |
| 5,974,438 A | 10/1999 | Neufeld |
| 6,003,144 A | 12/1999 | Neufeld |
| 6,009,524 A | 12/1999 | Olarig et al. |
| 6,026,016 A | 2/2000 | Gafken |
| 6,032,257 A | 2/2000 | Olarig et al. |
| 6,057,965 A | 5/2000 | Angelo et al. |
| 6,061,794 A | 5/2000 | Angelo et al. |
| 6,085,299 A | 7/2000 | Angelo et al. |
| 6,116,509 A | 9/2000 | Angelo et al. |
| 6,118,589 A | 9/2000 | Angelo et al. |
| 6,119,228 A | 9/2000 | Angelo et al. |
| 6,125,446 A | 9/2000 | Olarig et al. |
| 6,131,174 A | 10/2000 | Fischer et al. |
| 6,134,591 A | 10/2000 | Nickles |
| 6,167,538 A | 12/2000 | Neufeld et al. |
| 6,178,167 B1 | 1/2001 | Fraser |
| 6,182,892 B1 | 2/2001 | Angelo et al. |
| 6,199,167 B1 | 3/2001 | Heinrich et al. |
| 6,263,431 B1 | 7/2001 | Lovelace |
| 6,288,843 B1 | 9/2001 | Angelo et al. |
| 6,298,411 B1 | 10/2001 | Giacalone |
| 6,308,265 B1 | 10/2001 | Miller |
| 6,311,273 B1 | 10/2001 | Helbig, Sr. et al. |
| 6,330,674 B1 | 12/2001 | Angelo et al. |
| 6,363,449 B1 | 3/2002 | Sides et al. |
| 6,370,649 B1 | 4/2002 | Angelo et al. |
| 6,400,823 B1 | 6/2002 | Angelo |
| 6,401,208 B2 | 6/2002 | Davis et al. |
| 6,418,533 B2 | 7/2002 | Angelo et al. |
| 6,442,631 B1 | 8/2002 | Neufeld et al. |
| 6,460,121 B1 | 10/2002 | Bonola |
| 6,463,495 B1 | 10/2002 | Angelo et al. |
| 6,467,048 B1 | 10/2002 | Olarig et al. |
| 6,470,443 B1 | 10/2002 | Emer et al. |
| 6,477,648 B1 | 11/2002 | Schell et al. |
| 6,502,203 B2 | 12/2002 | Barron et al. |
| 7,116,782 B2 * | 10/2006 | Jackson et al. ............. 380/251 |

OTHER PUBLICATIONS

Angelo et al., "Method and Apparatus for Providing Enhanced Computer Security," U.S. Appl. No. 09/540,812, filed Mar. 31, 2000.

Angelo et al., "Computer System Having Security Features," U.S. Appl. No. 09/540,811, filed Mar. 31, 2000.

Neufeld, E. David, "Method and Apparatus for Preserving the Integrity of a Management Subsystem Environment," U.S. Appl. No. 09/967,268, filed Sep. 28, 2001.

Neufeld, et al., "Method and Apparatus for Generating a Strong Random Number for Use in a Security Subsystem for a Processor-Based Device," U.S. Appl. No. 09/966,890, filed Sep. 28, 2001.

Brown et al., "Method and Apparatus for Preserving a Strong Random Number Across Battery Replacement in a Security Subsystem," U.S. Appl. No. 10/037,511, filed Jan. 4, 2002.

Frantz et al., "Method and Apparatus for Initiating Strong Encryption Using Exisiting SSL Connection for Secure Key Exchange," U.S. Appl. No. 10/037,491, filed Jan. 4, 2002.

Reeves et al., "Virtual Media from a Directory Service," U.S. Appl. No. 10/038,239, filed Jan. 4, 2002.

Reeves et al., "Method and Apparatus for Increasing the Functionality and Ease of Use of Lights Out Management in a Directory Enabled Environment," U.S. Appl. No. 10/037,684, filed Jan. 4, 2002.

Frantz et al., "Method and for Identifying the Write Protect Status of a Diskette," U.S. Appl. No. 10/043,478, filed Jan. 10, 2002.

Angelo et al., "Method and Apparatus for Using a MAC Address as a Unique Machine Parameters to Identify Equipment," U.S. Appl. No. 10/184,146, filed Jun. 28, 2002.

Angelo et al., "Compact Mounting of Chip Card Reader at Front of Computer Device Bay Area," U.S. Appl. No. 09/115,068.

* cited by examiner

METHOD AND APPARATUS TO PROVIDE SECURE COMMUNICATION BETWEEN SYSTEMS

BACKGROUND OF THE INVENTION

This section is intended to introduce the reader to various aspects of art, which may be helpful in providing the reader with background information to facilitate a better understanding of the various aspects of the present techniques. Accordingly, it should be understood that these statements are to be read in this light, and not as admissions of prior art.

In the field of processor-based computer systems, it may be desirable for information to be transferred from a computer system to another computer system via a network. Computer networks may be arranged to allow information, such as files or programs, to be shared across an office or any geographic boundary. As an aspect of efficiently maintaining the exchange of information, computer systems in a network may include various security systems, such as programs or devices, to prevent unauthorized intrusions or attacks from outside sources. These security systems, for example, may prevent attacks from malicious or unknown code that corrupt data and programs stored on the computer system.

To maintain the security of a computer system, remotely accessible computer systems, such as servers, may rely on locally defined lists of users and passwords to perform such authentication and access control. Network administrators may maintain these lists on multiple systems, and users often keep track of separate accounts and passwords. Accordingly, these security systems may include a footprint of code within the read only memory (ROM), which may be a signed certificate. However, the size of the footprint may be quite large in some situations, such as web access.

Accordingly, it may be desirable to minimize the performance impact by providing security protection to the central processing unit ("CPU") of a computer system. For example, when access is attempted from a location not directly affiliated with the computer system, there may be no assurances of the actual identity of the user absent rigorous authentication.

BRIEF DESCRIPTION OF THE DRAWINGS

Exemplary embodiments of the present invention are apparent upon reading the following detailed description with reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

With processor-based systems, such as computer systems, a certificate may be used to provide identification, privileges, public and/or private keys for the authorized user. The certificate may be utilized to enhance security and performance for the system by enabling an authorized user to manage the network from a remote location. The certificate may be maintained at a relatively small size, which enables more space to be included for bug fixes and extra features without minimizing security. By maintaining the certificate, the disclosed embodiments may enable remote access to manage the system, so that additional functionality and bug fixes may be implemented.

For instance, while not limited in any way to such applications, the disclosed embodiments may enable an administrative system to issue commands to a managed system while reducing the amount of non-volatile random access memory being utilized. In these embodiments, various encryption methods and authorization processes may be implemented to provide various protections that enable the systems to operate in a more secure manner. Thus, the disclosed embodiments may enable an processes may be implemented to provide various protections that enable the systems to operate in a more secure manner. Thus, the disclosed embodiments may enable an administrative system to utilize a reduced amount of non-volatile random access memory, while maintaining the security for the managed system.

Figure 1:
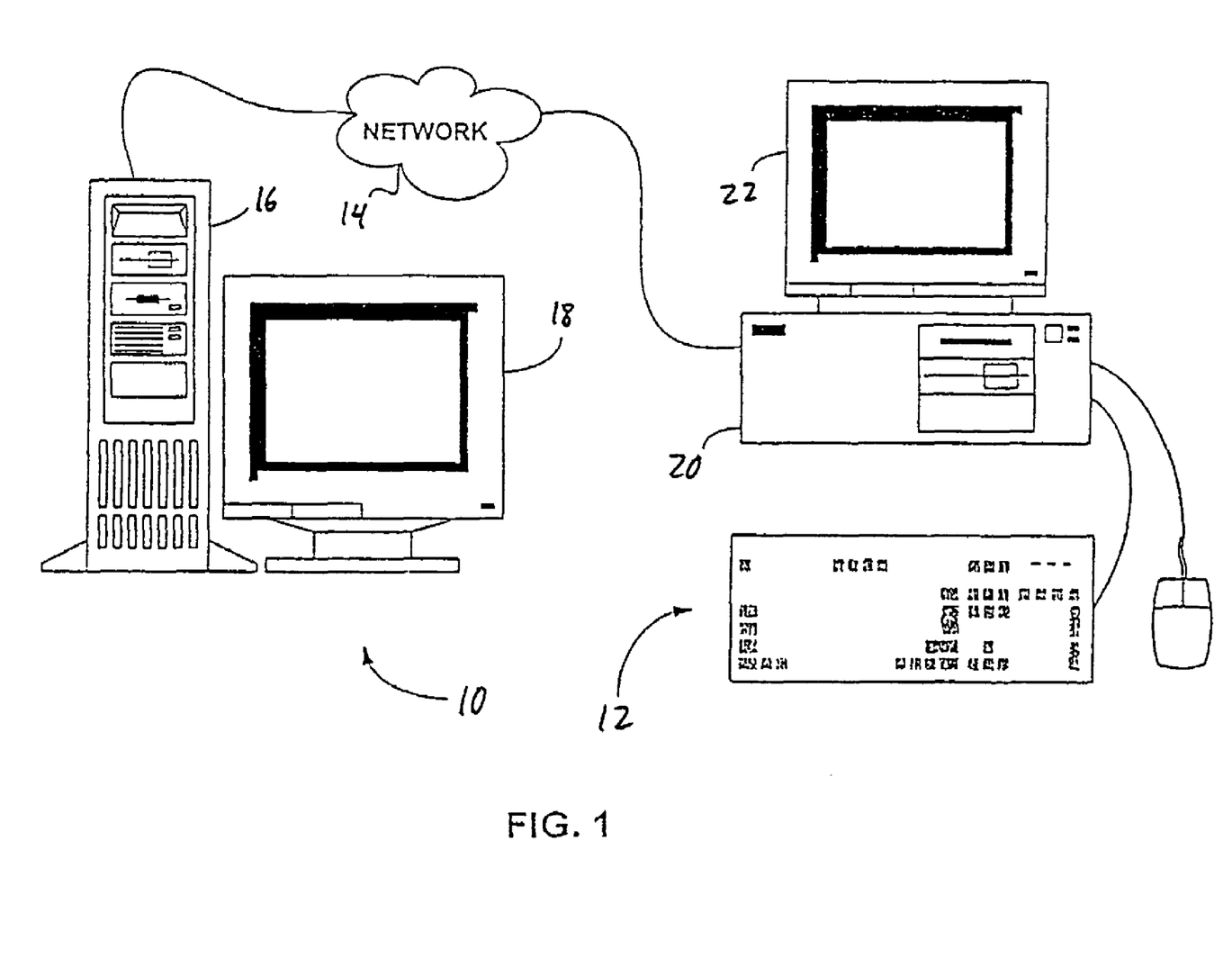
FIG. 1 is a connection diagram of an administrative system and a managed system in accordance with embodiments of the present invention.

Referring first to FIG. 1, a diagram of a managed system and an administrative system in accordance with embodiments of the present invention is illustrated. In this embodiment, a network infrastructure 14 may be utilized to illustrate a computer network configuration. In this network infrastructure 14, a managed system 10, such as a server or workstation, may connect to an administrative system 12, which may be a single system or a plurality of remote systems, such as workstations and/or servers. In practice, those of skill in the art will appreciate that the any number of systems may be included in the network infrastructure 14, but for simplicity two systems are depicted.

Each of the systems 10 and 12 may include hardware for operating the respective systems 10 and 12. The managed system 10 may include a central processing unit ("CPU") 16 which houses a processor, memory, communications interface, and other circuitry as described more fully below. The managed system 10 may include a monitor 18 along with one or more software programs, such as an application for operating a process or managing information. Likewise, the administrative system 12 may include a CPU 20 and a monitor 22. In addition, the administrative system 12 may include one or more software programs for maintaining or for utilizing the managed system 10.

To communicate with each other, the systems 10 and 12 may be connected via a network infrastructure 14, which may include of any combination of hubs, switches, routers and the like. For example, the network infrastructure 14 may be a local area network ("LAN"), metropolitan area network ("MAN"), or wide area network ("WAN"), which may include a private network, a public network, such as the Internet, or combination of both. As those skilled in the art will appreciate, neither the exact topology of the network illustrated in FIG. 1 nor the protocol of network communication (for example, Ethernet or any number of other common protocols) is believed to be a crucial aspect of the disclosed embodiments. Moreover, the network topology shown in FIG. 1 is one an example of a network environment in which the disclosed embodiments are useful.

Figure 2:
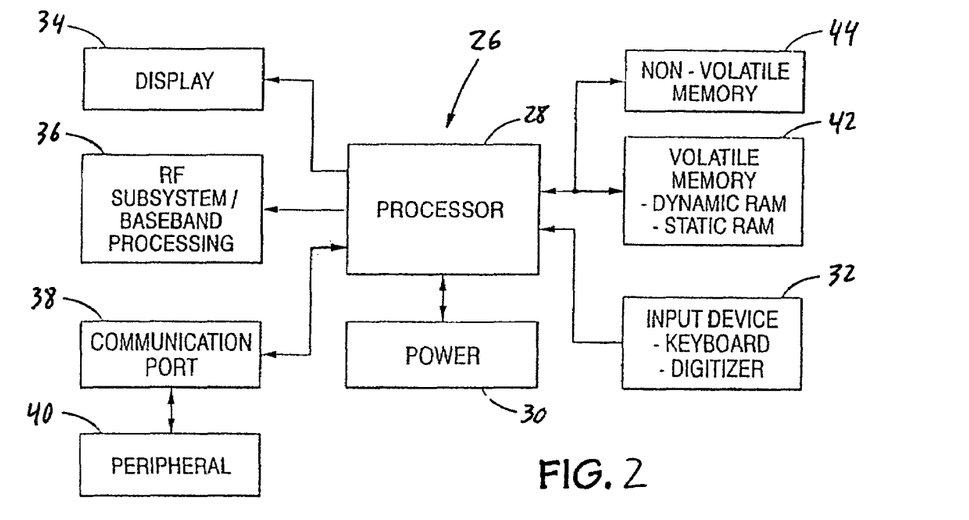
FIG. 2 illustrates a block diagram of an exemplary processor-based device in accordance with the present invention.

Now referring to FIG. 2, a block diagram depicting an exemplary processor-based device 26, which may be used in the systems 10 and 12 is illustrated. The device 26 may be any of a variety of different types, such as a computer, personal organizer, and control circuit to name a few examples. In a processor-based device, a processor 28, such as a microprocessor, may control many of the functions of the device 26.

The device 26 may include a power supply 30. For instance, if the device 26 is portable, the power supply 30 may include permanent batteries, replaceable batteries, and/or rechargeable batteries. The power supply 30 may also include an A/C adapter, so that the device may be plugged into a wall outlet, for instance. In fact, the power supply 30 may further include a D/C adapter, so that the device 26 may be plugged into a DC power source or vehicle's cigarette lighter, for instance.

Various other devices may be coupled to the processor 28, depending upon the functions that the device 26 performs. For instance, a user interface 32 may be coupled to the processor 28. The user interface 32 may include buttons, switches, a keyboard, a light pin, a mouse, and/or a voice recognition system, for instance. A display 34 may also be coupled to the processor 28. The display 34 may include an LCD display, a CRT, LEDs, and/or an audio display. Furthermore, an RF subsystem/baseband processor 36 may also be coupled to the processor 28. The RF subsystem/baseband processor 36 may include an antenna that is coupled to an RF receiver and to an RF transmitter (not shown). A communications port 38 may also be coupled to the processor 28. The communications port 38 may be adapted to couple to a peripheral device 40, such as a modem, a printer, or a computer, for instance, or to a network, such as the network infrastructure 14 depicted in FIG. 1.

Because the processor 28 may control the functioning of the device 26 under the control of software programming, memory may be coupled to the processor 28 to store and facilitate execution of the program. For instance, the processor 28 may be coupled to volatile memory 42, which may include dynamic random access memory ("DRAM") and/or static random access memory ("SRAM"). The processor 28 may also be coupled to non-volatile memory 44. The non-volatile memory 44 may include a read only memory ("ROM"), such as an EPROM, nonvolatile random access memory ("NVRAM"), and/or Flash memory, to be used in conjunction with the volatile memory 42. The size of the ROM may be selected to be just large enough to store any BIOS operating system, application programs, fixed data, and security information. The volatile memory 42, on the other hand, may be quite large so that it may store dynamically loaded applications. Additionally, the non-volatile memory 44 may include a high capacity memory such as a disk or tape drive memory.

As previously discussed, it may be desirable to protect computer systems from external systems, users, or programs. Providing "security" for a system may involve providing protection from a variety of possible unwanted sources. For instance, providing security may include protecting a system from viruses or from hackers. To provide this protection, the device may prevent any change in operating system passwords. For instance, protection measures may include authentication of attached machines and prevention of rogue or external devices, which may be foreign to the internal system.

To protect the system, security measures may involve "cryptography." Cryptography may be used to protect both data and communications. Encryption may be accomplished through the use of a cryptographic algorithm, which is essentially a mathematical function. The encryption method utilized may involve a variety of different encryption techniques, such as symmetric-key encryption or public key encryption.

The public key encryption may include a key based system, where special knowledge of specific information called a "key" may be utilized to decrypt the encrypted message. For instance, the cryptographic algorithm may be an asymmetric or "public key" algorithm. In public key cryptographic systems, each user has two related complimentary keys, a publicly revealed key and a private key. Each key may unlock the code that the other key makes. Knowing the public key provides no corresponding information regarding the private key. A public key may be stored in a memory, such as the managed system 10 in FIG. 1, to provide wide access to the public key. However, the public key may be useful to decrypt data, which has been encrypted with a corresponding private key, which may be stored within the administrative system 12 of FIG. 1.

A mechanism for privacy may be created by using hashes of commands and/or arguments and transmitting the hashes between the systems 10 and 12. Then, when the hashes are delivered to the other system 10 or 12, the hashes may be examined to determine the command and/or argument. The command and/or argument may be further protected through encryption with a private key. The private key may allow the command and/or argument to be signed by a specific user as previously discussed. Thus, a privacy mechanism may be utilized to allow a system 10 or 12 to exchange messages with additional security protection, and may be further enhanced by the use of "digital signatures," as described below.

Digital signatures may be used to provide message authentication. The sender may use his own private key to encrypt a hash thereby "signing" the message. The encryption process creates a unique signature, which may allow for easy detection of any changes in the message. The recipient may verify the digital signature by using the sender's public key to decrypt it. This verification process may enable the recipient to verify that the sender is the true originator of the message and that the message has not been subsequently altered by anyone else, because the sender possesses the private key that produced that digital signature.

Encryption techniques, such as hashing and the use of digital signatures, may be combined to provide both privacy and authentication by first signing a message with the sender's private key then encrypting the signed message with the recipient's public key. The recipient may reverse the steps by first decrypting the message with its own private key, and then checking the enclosed digital signature with the sender's public key. In this way, the encrypted message may not be read by anyone but the recipient.

This type of cryptographic algorithm may be implemented in a memory system to ensure that the current transmission is authorized and uncorrupted. The hash algorithm, hash value, and digital signature may be located in nonvolatile random access memory ("NVRAM") or any memory component, such as read only memory ("ROM"). For instance, the hash algorithm, hash value, and digital signature may be located within the boot block in the NVRAM or ROM. Thus, with the hash algorithm, hash value, and digital signature being located within the memory, a computer system may be able to validate the authentic sender of a message, as described below.

Figure 3:
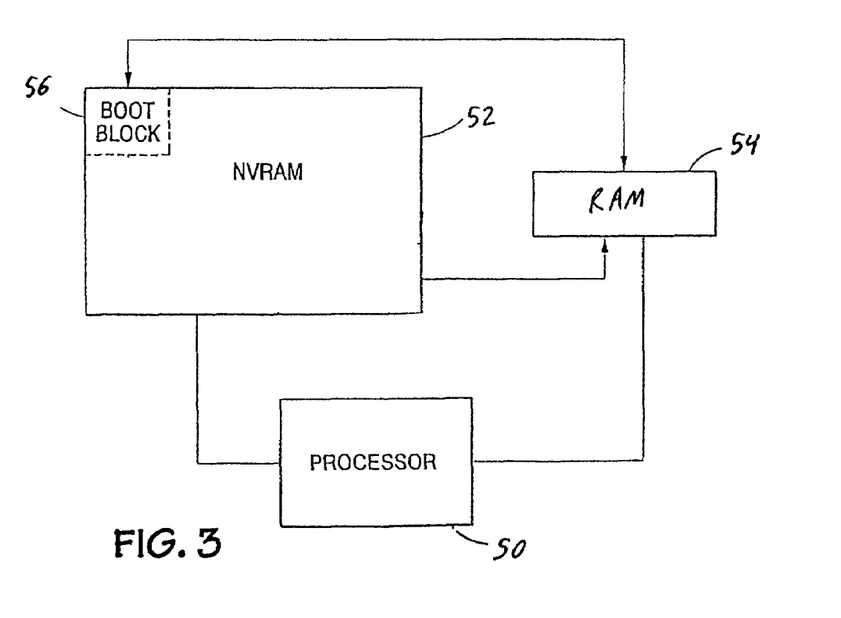
FIG. 3 illustrates a block diagram of a processor-based system with a processor operatively coupled to various memory devices in accordance with the present invention.

FIG. 3 illustrates a simplified block diagram of a general processor-based system with a processor operatively coupled to various memory devices, which may be in systems 10 and/or 12 of FIG. 1. Referring briefly to FIG. 2, recall that the processor 28 may be coupled to both volatile memory 42 and non-volatile memory 44. Accordingly, the processor 50 in FIG. 3 may be coupled to a segment of non-volatile memory, such as an NVRAM component 52 or ROM, and a segment of volatile memory, such as CMOS or RAM component 54. As previously discussed, the hash algorithm, the hash value, and the digital signature may be a segment in the NVRAM 204. Alternatively, the hash algorithm, the hash value, and the digital signature may be a separate flashable or reprogrammable chip.

Also illustrated in FIG. 3 is a Boot Block 56. The Boot Block 56 may be used to validate the other components within the system, such as the BIOS, firmware, or other components, such as memory or hardware components. Within the Boot Block 56, the hash algorithm, the hash value, and the digital signature may be located to assist in the validation processes. Each time the system is powered-on, the Boot Block 56 may verify that the hardware components or firmware are valid. As an additional verification, the BIOS or other segments of the NVRAM 52 or CMOS 54 may also be used to validate the Boot Block 56 as well.

In the NVRAM 52, the footprint of the code may provide various functions, but may be limited as to the amount of space that may be consumed. For instance, the NVRAM 52 may include bug fixes and extra features that may utilize additional space. Likewise, the Boot Block 56 may include logic to check firmware. Additional space may be utilized to include the digital signature, hash value, and/or hash algorithm to ensure that the firmware originates from a specified company, such as Hewlett Packard. These components may utilize segments that take up large amounts of space in the NVRAM 52.

If the administrative system and managed system are being utilized in a network, such as the Internet or LAN, the public key encryption may utilize a certificate. The certificate may include identification credentials, privileges, a user's or an individual's public key, and time for authorized access. Also, the certificate may include information that validates the identification of the administrative system. This information may consume a significant amount of space, which may be either transmitted across the network or stored on the managed system. With the space in nonvolatile memory being limited, the number of remote systems that may access the managed system is accordingly limited. In addition to the memory limitations, transmitting the information across the network is time consuming with such large files. With an Internet or intranet environment, increasing the amount of information to be exchanged across the network may significantly impact the time consumed by the process. Thus, the reduction of the size of the certificate or information about the administrative system being transmitted across the network may allow the systems on the network and individual systems to operate in an enhanced or more efficient manner.

To reduce the size of the certificate or information, the public key, private key, and/or hashing may be used to reduce the amount of information transmitted across the network to a managed system. This reduction may be accomplished in a variety of ways. For instance, an administrator may send a command and signed certificate to a managed system from the administrator system or a remote system. The managed system may lookup and authorize or verify the credentials from memory or a database. Then, with the credentials verified, the memory or database may respond with a list of allowed commands. If the command is on the list, then the command may be executed. However, if the command is not on the list then the command may not be performed, and the managed system may abort the request.

Alternatively, the administrator may send the hashed credentials encrypted with a private key along with the command. The managed system may have the public key to decrypt the credentials and may store the hash of the credentials to compare with the decrypted hash. To enable access, the managed system may compare the stored hash with the decrypted hash. To enable other commands, the managed system may compare the credentials with authorized rights to perform the commands. If the command is within a database or a list coupled to the managed system, then the command may be executed. However, if the command is not allowed, then the command may not be performed and the managed system may abort the request. Thus, with these various embodiments, the certificate may be reduced in size and/or may be stored in nonvolatile memory on the managed system, as further described in FIGS. 4 through 9.

Figure 4:
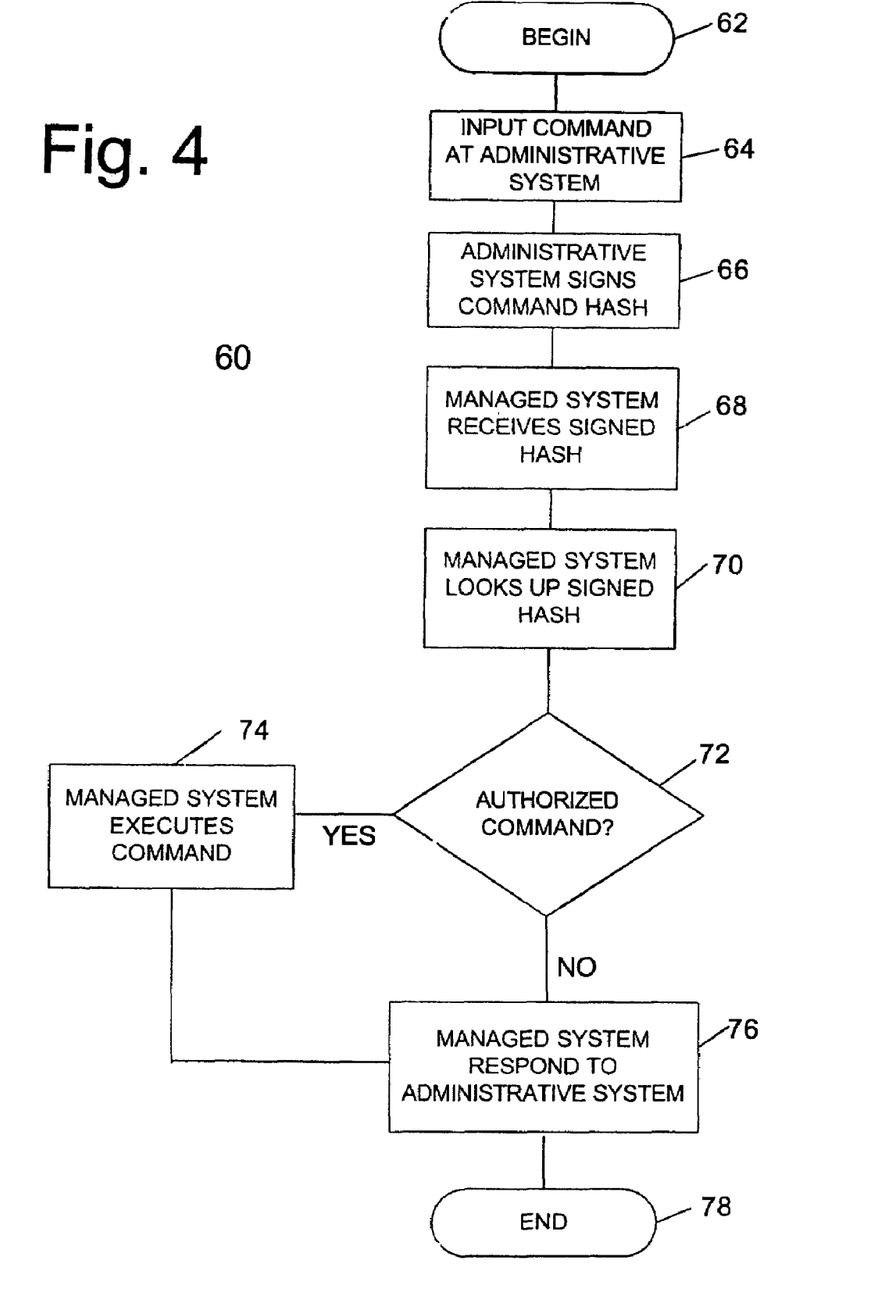
FIG. 4 illustrates a flow chart wherein a managed system may be used to validate a digital signature to gain access to the managed system in accordance with the present invention.

Referring to FIG. 4, a flow chart is illustrated wherein a managed system may be used to validate a digital signature and to allow access to a remote system in accordance with an embodiment of the present invention. In this flow chart 60, a remotely accessed system, such as the managed system 10 of FIG. 1, may be communicating with a remote system, such as the administrative system 12 of FIG. 1. The flow chart 60 begins at step 62. At step 64, a user may issue a command, such as command with no argument (i.e. shutdown, halt, and/or initialize). The administrative system 12 may modify the command by applying a hash algorithm to the command, for example, and then sign the command hash with a digital signature to form a signed hash in step 66. As discussed above, the hashing of the command encrypts the command, while signing the command hash with a private key may ensure that the recipient may verify that the sender is authentic.

At step 68, the signed hash is received by the managed system 10, where a variety of functions may be performed. The managed system 10 may verify the signed hash by accessing a database or accessing a portion of memory in step 70 to lookup the proper hash, for example. To lookup the signed hash, the managed system 10 may receive a list of allowed commands, access rights, and/or verification of a security level. Various commands, access rights, and/or verifications may be hashed and/or signed by the managed system 10 and stored as a reference hash before the signed hash is received. After receiving the signed hash information in step 72, the managed system 10 may validate the authorization. In validating the command, the managed system 10 may compare the signed hash with the information from the database, such as the list of allowed commands, for instance. This comparison allows the administrative system 12 to communicate the signed hash of the command, which may reduce the amount of traffic transmitted across the network and may reduce the information that is stored in relation to the administrative system 12. If the command is valid, then the managed system 10 may execute the command in step 74. Then, the managed system 10 may respond to the administrative system 12 in step 76. However, if the command is unauthorized, the managed system 10 may not execute the command and may respond accordingly to the administrative system 12 in step 76. Thus, the flow chart ends at step 78.

Figure 5:
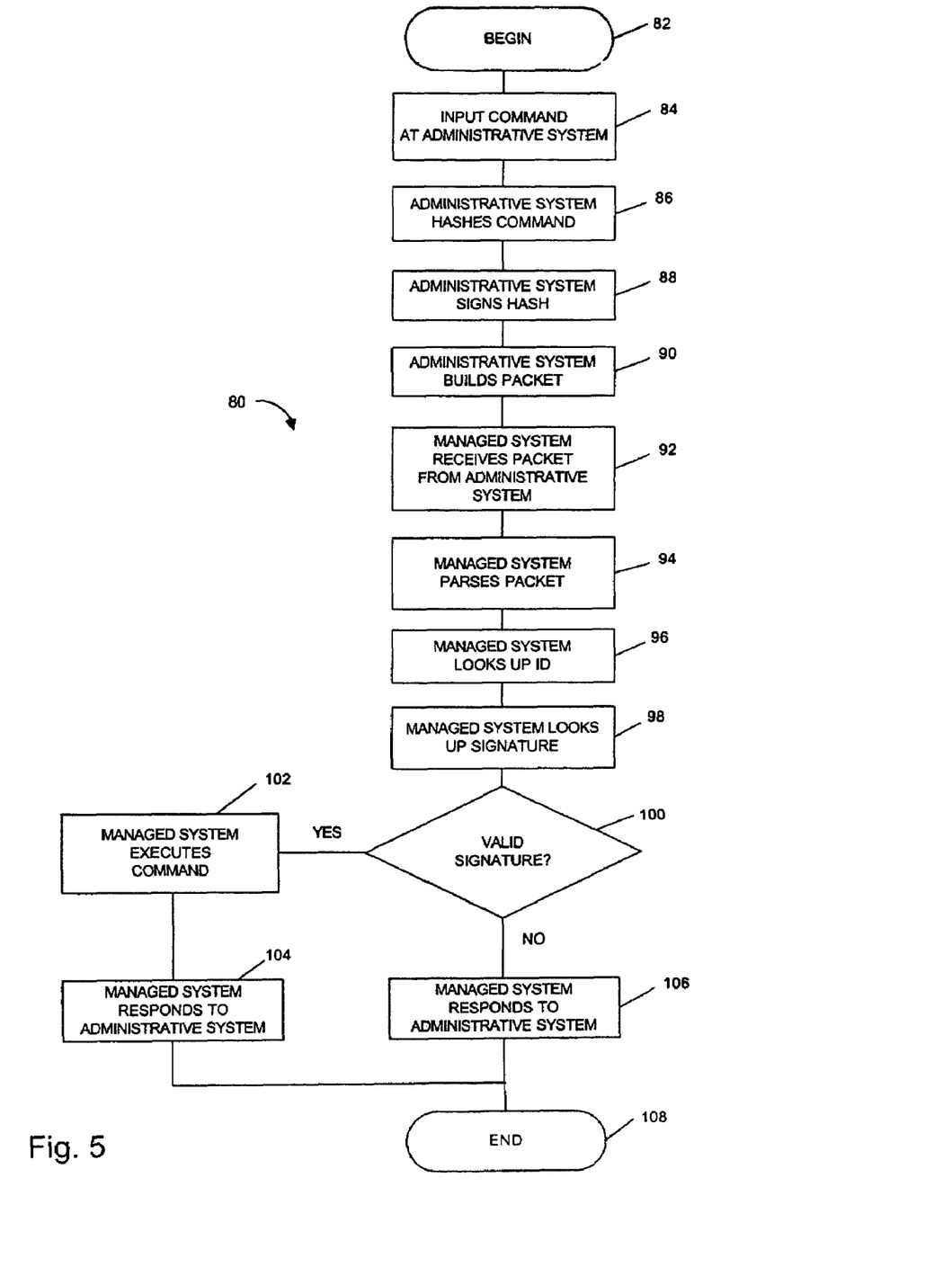
FIG. 5 illustrates a flow chart wherein a managed system may be used to validate a digital signature by parsing the packet to gain access to the managed system in accordance with the present invention.

Alternatively in FIG. 5, a flow chart depicting a second embodiment is illustrated wherein a managed system may validate a digital signature by parsing a packet to allow access to a remote system. In this flow chart 80, a remotely accessed system, such as the managed system 10 of FIG. 1, may be communicating with a remote system, such as the administrative system 12 of FIG. 1. The flow chart 80 begins at step 82. At step 84, a user may issue a command and identification, such as commands with no argument (i.e. shutdown, halt, or initialize, for instance). The administrative system 12 may modify the command and identification, by applying a hash algorithm to the command and identification, for example, to encrypt the items in step 86. Then, at step 88, the administrative system 12 may sign the hash with a digital signature to ensure that the recipient verifies that the sender is authentic, as discussed above with regard to block 66 of FIG. 4. Once the hash is formed into a signed hash, the administrative system 12 in step 90 may include additional information with the signed hash to form a packet that may include identification and routing information, for instance.

At step 92, the signed hash is received by the managed system 10, where a variety of functions may be performed. The managed system 10 may parse the packet in step 94 to gain access to the command hash and other fields of information, such as the identification, signature, or signed hash. After parsing the packet, the identification may be used to perform a look-up in step 96. Then, the managed system 10 may locate the signature in step 98. With the signature, the managed system 10 may verify the signature by accessing a database or accessing a portion of memory in step 100. From the signature lookup, the managed system 10 may receive a list of allowed commands, access rights, or verification of a security level. As discussed above, the commands may be stored in a hashed and/or signed form as a reference hash. In verifying the signature, the managed system 10 may compare the signature with the information from the database, such as the list of allowed commands or authorization level, for instance. This comparison allows the administrative system 12 to transmit the signed command and the signed identification, which may be smaller amounts of information, to reduce the information that is transmitted across the network, while providing additional security. If the signature is valid, then the managed system 10 may execute the command in step 102. Then, the managed system 10 may respond to the administrative system 12 with a remark, such as done, in step 104. However, if the signature is invalid, the managed system 10 may not execute the command and simply respond to the administrative system 12 with an abort status in step 106. Thus, following steps 106 or 104, the flow chart ends at step 108.

Figure 6:
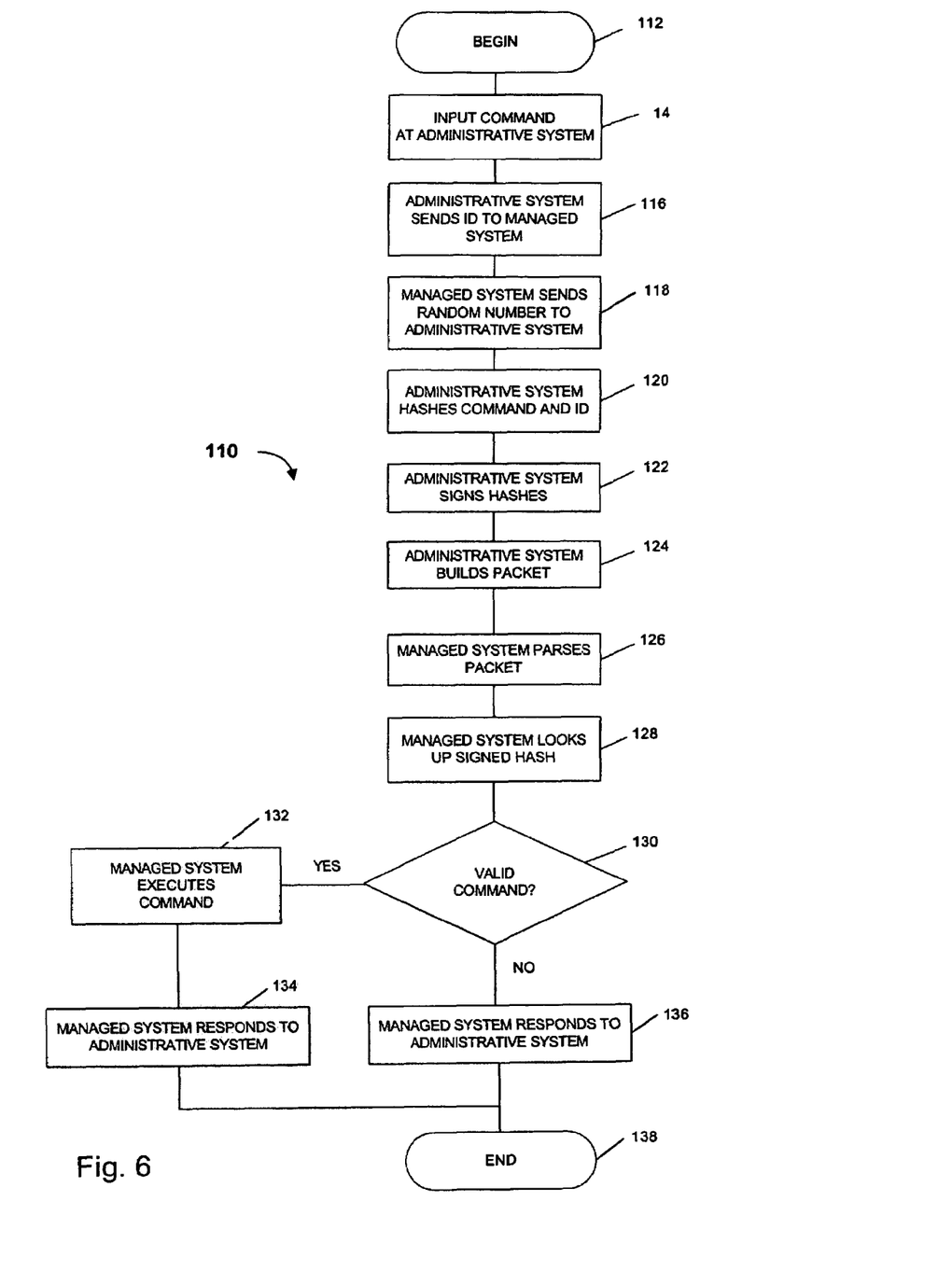
FIG. 6 illustrates a flow chart wherein a managed system may be used to validate a digital signature by providing a random number to gain access to the managed system in accordance with the present invention.

In FIG. 6, a flow chart depicting a third embodiment is illustrated wherein a managed system may be used to validate a digital signature by providing a randomly generated number to allow access to a remote system. In this flow chart 110, a remotely accessed system, such as the managed system 10 of FIG. 1, may be communicating with a remote system, such as the administrative system 12 of FIG. 1. The flow chart 110 begins at step 112. At step 114, a user may issue a command, such as commands without arguments (i.e. shutdown, halt, or initialize, for instance). The administrative system 12 may send identification information to the managed system 10 to have a randomly generated value provided for exchanging messages in step 116.

In step 118, the managed system 10 may generate a number, such as a nonce, which may be a randomly generated value that provides additional security. The randomly generated number may defeat playback attacks by providing the system with a new number that may be randomly generated for the specific system's connection or message. The number, which may be a secret key, may be used by the administrative system 12 to encrypt the packets for the communication exchange. If an administrative system 12 does not provide the proper number, the managed system 10 may deny any communications or abort a connection.

Once the randomly generated number is received by the administrative system 12, the administrative system 12 may modify the command and identification, by applying a hash algorithm to the command and identification to encrypt the items in step 120. In applying the hash algorithm, the administrative system 12 may use the randomly generated number or a hash value in the administrative system 12. At step 122, the administrative system 12 may sign the hash to ensure that the recipient may verify that the sender is authentic. The signing of the hash may involve using a private key or the randomly generated number to encrypt the command hash. Once the hash is formed into a signed hash, the administrative system 12 in step 124 may include additional information with the signed hash to form a packet that may include routing information or other similar information, for instance.

At step 126, the signed hash may be received by the managed system 10, where a variety of functions may be performed. The managed system 10 may parse the packet in step 126 to gain access to the specific information within the packet along with the other fields of information, such as the signed hash, for instance. After parsing the packet, the managed system 10 may perform a look up in step 128 to provide a list or data associated with the signed hash. The lookup of the signed hash may include receiving or accessing a list of allowed commands, access rights, or verification of a security level. As discussed previously, a reference hash may be created before the signed hash is received. The reference hash may be a previously stored version of the hash and/or may be combined with the nonce in any suitable manner.

With the signed hash, the managed system 10 may verify that the command is valid by accessing a database or accessing a portion of memory in step 130. By verifying the signed hash, the administrative system 12 may simply transmit the signed command and the signed identification. Sending these elements may reduce the amount of information that may be transmitted across the network, while providing additional security by utilizing the random number. In verifying the signed hash, the managed system 10 may compare the signed hash with the information from the database, such as the list of allowed commands or authorization levels, for instance. If the signed hash is valid, then the managed system 10 may execute the command in step 132. Then, the managed system 10 may respond to the administrative system 12 with a response, such as "done," in step 134. However, if the signed hash is invalid, the managed system 10 may not execute the command and may respond accordingly to the administrative system 12 in step 136. The response to the administrative system 12 may include an "abort" status. Thus, following steps 134 or 136, the flow chart ends at step 138.

Figure 7:
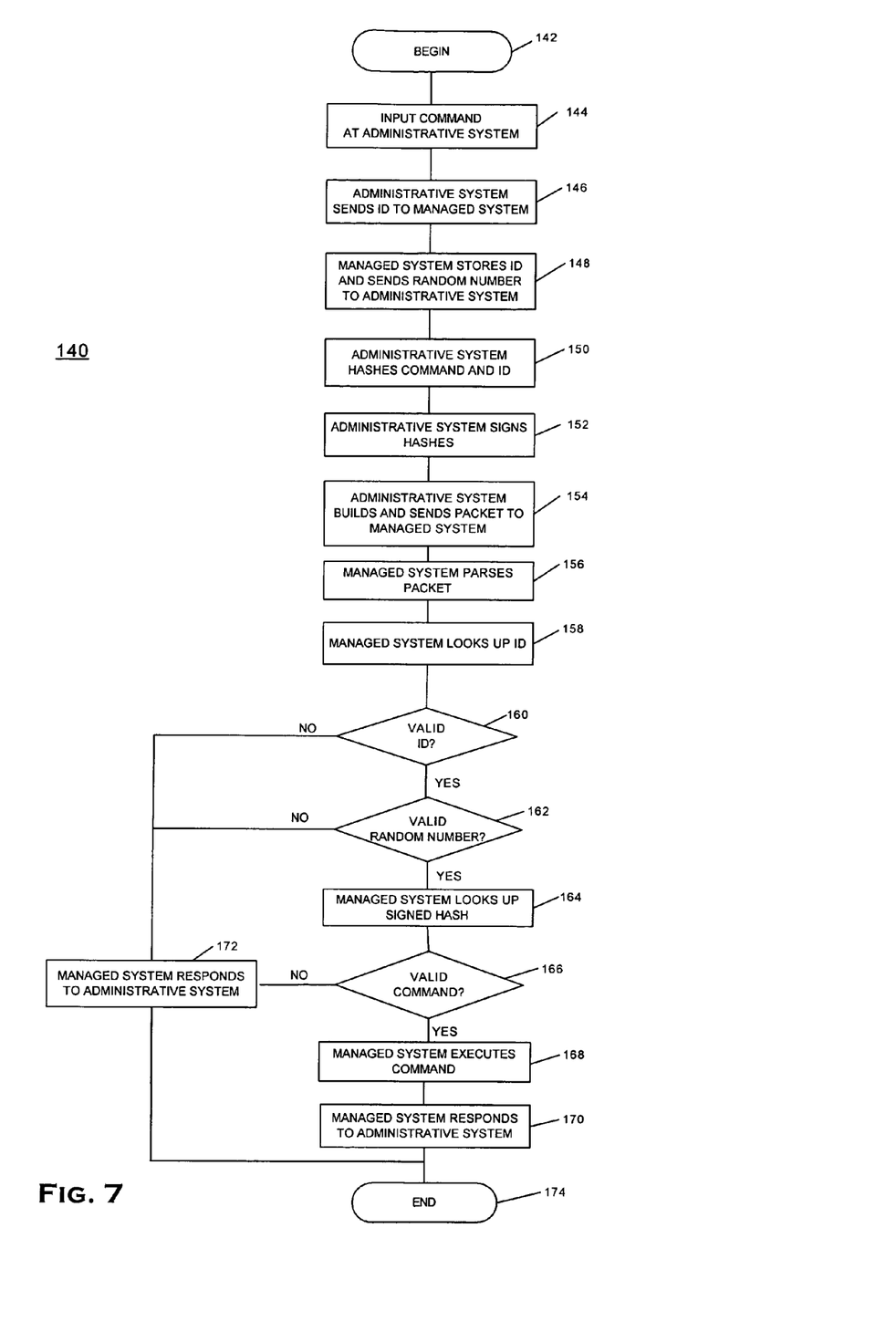
FIG. 7 illustrates a flow chart wherein a managed system may be used to validate a digital signature by verifying a random number to gain access to the managed system in accordance with the present invention.

In FIG. 7, a flow chart depicting a fourth embodiment is illustrated wherein a managed system may be used to validate a digital signature by verifying a randomly generated number to allow access to a remote system. In this flow chart 140, a remotely accessed system, such as the managed system 10 of FIG. 1, may be communicating with a remote system, such as the administrative system 12 of FIG. 1. The flow chart 140 begins at step 142. At step 144, a user may issue a command, such as commands with no arguments (i.e. shutdown, halt, or initialize, for instance). The administrative system 12 may send identification to the managed system 10 to have a randomly generated number provided for exchanging messages in step 146.

In step 148, the managed system 10 may store the identification, generate a randomly generated number, and send the number to the administrative system 12. As discussed above, the randomly generated number may be a nonce, which may provide the administrative system 12 with a unique value that is unknown to other remote systems. This number may be used by the administrative system 12 as a secret key to encrypt the packets for the communication exchange. Thus, it would be difficult or impossible for a system to predict the number that may be generated by the managed system 10 prior to the message being sent to the administrative system 12. If an administrative system 12 does not provide the proper number, the managed system 10 may deny the communication or abort the connection.

Then, the administrative system 12 may modify the command and identification, by applying a hash algorithm to the command and identification to encrypt the items in step 150. In applying the hash algorithm, the administrative system 12 may use the randomly generated number or a hash value in the administrative system 12. At step 152, the administrative system 12 may sign the hash to ensure that the recipient may verify that the sender is authentic. Signing of the hash may involve using a private key or the randomly generated number to encrypt the hash. Once the hash is formed into a signed hash, the administrative system 12 in step 154 may include additional information as discussed in block 124 of FIG. 124.

At step 156, the signed hash is received by the managed system 10, where a variety of functions may be performed. The managed system 10 may parse the packet in step 156 to gain access to the specific information as discussed above. After parsing the packet, the identification may be used to perform a look up in step 158, which may include accessing a list from memory or a database that has the identification, the number, or other information. Accordingly, the managed system 10 may use one or more of the verification steps to deny access prior to performing the command.

For instance, with the identification, the managed system 10 may verify the identification is valid by accessing a database or accessing a portion of memory in step 160. If the verification process is invalid, the managed system 10 may not execute the command and simply respond to the administrative system 12 in step 172. The response to the administrative system 12 may be a message with an abort status. However, if the identification is valid, then the managed system 10 may verify that the number is valid in step 162. In verifying the number, the managed system 10 may access a remote database or access a portion of memory. If the number is invalid, the managed system 10 may not execute the command and simply respond to the administrative system 12 in step 172. The response to the administrative system 12 may be a message with an abort status in step 172. However, if the number is valid, then the managed system 10 may verify that the number is valid in step 162.

With the signed hash in step 164, the managed system 10 may lookup or may access a list of allowed commands from a database or segment of memory in the managed system 10. At step 166, the managed system 10 may verify the command by comparing the signed hash with the information from the database, such as the list of allowed commands or authorization levels, for instance. To validate the command, the managed system 10 may use one or more of the verification steps to allow the command in a verification process, as discussed above. If the command is valid, then the managed system 10 may execute the command in step 168. Then, the managed system 10 may respond to the administrative system 12 with a response, such as "done," in step 170. However, if the verification process is invalid, the managed system 10 may not execute the command and may respond accordingly to the administrative system 12 in step 172. The response to the administrative system 12 may be a message with an abort status. Thus, following steps 170 or 172, the flow chart 140 ends at step 174.

Figure 8:
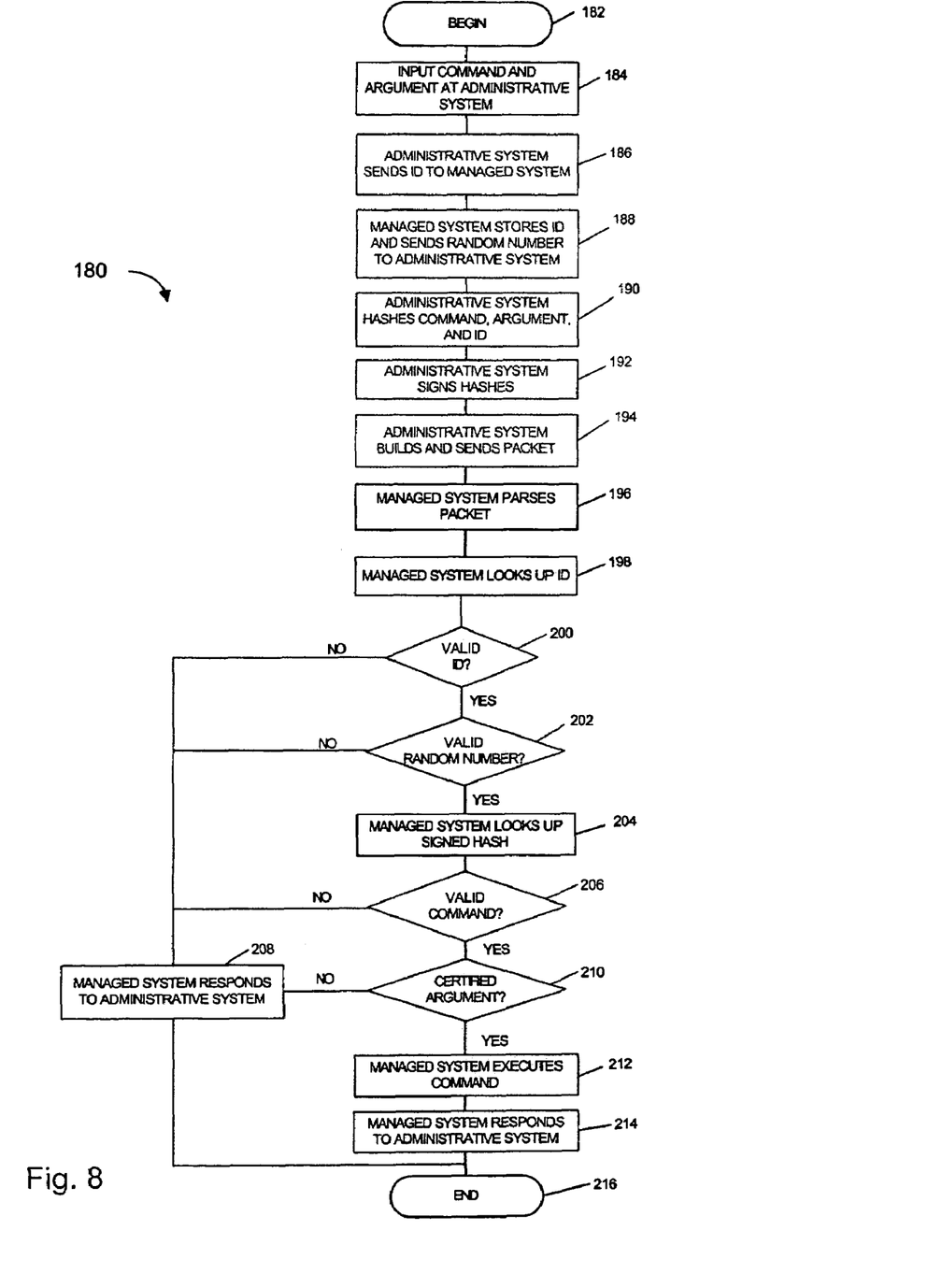
FIG. 8 illustrates a flow chart wherein a managed system may be used to validate a digital signature by verifying a random number, command, and arguments to gain access to the managed system in accordance with the present invention.

In FIG. 8, a flow chart depicting a fifth embodiment is illustrated wherein a managed system may be used to validate a digital signature by verifying a randomly generated number to allow access to a remote system. In this flow chart 180, a remotely accessed system, such as the managed system 10 of FIG. 1, may be communicating with a remote system, such as the administrative system 12 of FIG. 1. The flow chart 180 begins at step 182. At step 184, a user may issue a command, such as commands with arguments (i.e. format for instance). The administrative system 12 may send identification to the managed system 10 to have a randomly generated number provided for exchanging messages in step 186.

In step 188, the managed system 10 may store the identification, generate a randomly generated number, and send the number to the administrative system 12. As discussed above, the randomly generated number may be a nonce, which may provide the administrative system 12 with a unique value that is random. This number may be used by the administrative system 12 as a secret key to encrypt the packets for the communication exchange. Thus, no system may predict the number that may be generated by the managed system 10 prior to the message being sent to the system. If an administrative system 12 does not know the proper number, the managed system 10 may deny any communications or abort the connection.

Then, the administrative system 12 may modify the command and identification, by applying a hash algorithm to the command and identification to encrypt the items in step 190. Also, in step 190, the administrative system 12 may modify the arguments and identification, by applying a hash algorithm to the arguments and identification to encrypt the items in step 190. In applying the hash algorithm, the administrative system 12 may use the randomly generated number or a hash value within the administrative system 12 to hash the information. At step 192, the administrative system 12 may sign the command hash and the argument hash to ensure that the recipient may verify that the sender is authentic. Signing of the hashes may involve using a private key or the randomly generated number to encrypt the hashes. The command hash may form a signed command hash, while the argument hash may form a signed argument hash. Once the hashes are formed, the administrative system 12 in step 194 may form a packet or packets that may include routing information or other information, for instance.

At step 196, the signed hashes are received by the managed system 10, where a variety of functions may be performed. The managed system 10 may parse the packet in step 196 to gain access to the specific information within the packet along with other fields of information, such as the identification, the number, or signed hashes. After parsing the packet, the managed system 10 may perform a look up of the identification in step 198. The identification may provide the managed system 10 with other security information, such as access rights, etc. Accordingly, the managed system 10 may use one or more of the verification steps to deny access prior to performing the command.

For instance, with the identification, the managed system 10 may verify that the identification is valid by accessing a database or accessing a portion of memory in step 200. If the identification is invalid, the managed system 10 may not execute the command and simply respond to the administrative system 12 in step 208. The response to the administrative system 12 may be a message with an abort status. However, if the identification is valid, then the managed system 10 may verify that the random number is valid in step 202. With step 202, the managed system 10 may access a remote database or access a portion of memory to verify the random number. If the random number is invalid, the managed system 10 may not execute the command and simply respond to the administrative system 12 in step 208. The response to the administrative system 12 may be a message with an abort status. Yet, if the random number is valid, then the managed system 10 may perform a lookup of the signed hash in step 204. By verifying the identification and the number, the administrative system 12 may provide additional security to the network with minimal additional network interact.

With the signed hash in step 204, the managed system 10 may lookup or may access a reference hash or a list of allowed commands from a database or segment of memory within the managed system 10. At step 206, the managed system 10 may determine if the command is valid. In this step, the managed system 10 may verify the command by comparing the signed hash with the information from the database, such as the list of allowed commands or authorization levels, for instance. If the command is invalid, the managed system 10 may not execute the command and simply respond to the administrative system 12 with an abort status in step 208. However, if the command is valid, then the managed system 10 may determine if the arguments are certified or valid in step 210. If the arguments are valid, then the managed system 10 may execute the command in step 212. Then, the managed system 10 may respond to the administrative system 12 with a response, such as "done," in step 214. However, if the arguments are not certified, the managed system 10 may not execute the command and simply respond to the administrative system 12 in step 208. The response to the administrative system 12 may be a message with an abort status. Thus, following steps 208 or 214, the flow chart 180 ends at step 216.

While the invention may be applicable to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of providing secure communication between a remote system and a remotely accessed system, comprising:
    calculating at the remote system a first hash of an operation using a hash algorithm;
    encrypting at the remote system the first hash to form a signed hash;
    receiving at the remotely accessed system the signed hash from the remote system;
    storing at the remotely accessed system a reference hash in a section of non-volatile memory before receiving the signed hash;
    validating at the remotely accessed system the signed hash using the reference hash; and
    executing at the remotely accessed system the operation associated with the signed hash if the signed hash is validated.

2. The method, as set forth in claim 1, comprising responding to the remote system based on the validation of the signed hash.

3. The method, as set forth in claim 2, wherein responding to the remote system comprises generating a completion message if the signed hash is validated.

4. The method, as set forth in claim 2, wherein responding to the remote system comprises generating an error message if the signed hash is not validated.

5. The method, as set forth in claim 1, wherein the operation comprises a command.

6. The method, as set forth in claim 1, wherein the operation comprises identification information.

7. The method, as set forth in claim 1, wherein validating comprises accessing a database to access the reference hash.

8. The method, as set forth in claim 1, wherein validating comprises parsing a packet to access the signed hash.

9. A method of providing secure communication between systems, comprising:
    delivering identification information to a remotely accessed system from a remote system;
    creating a nonce at the remotely accessed system;
    delivering the nonce to the remote system;
    calculating at the remote system a first hash of an operation using a hash algorithm;
    encrypting at the remote system the first hash along with the nonce to form a signed hash;
    receiving at the remotely accessed system the signed hash from the remote system;
    storing at the remotely accessed system a reference hash in a section of non-volatile memory before receiving the signed hash;
    validating at the remotely accessed system by comparing the signed hash to the reference hash; and executing at the remotely accessed system the operation associated with the signed hash if the signed hash is validated.

10. The method, as set forth in claim 9, wherein encrypting comprises signing at the remote system the first hash to form the signed hash.

11. The method, as set forth in claim 9, comprising parsing at the remotely accessed system a packet for the first signed hash.

12. The method, as set forth in claim 9, comprising responding to the remote system based on the validation of the signed hash.

13. The method, as set forth in claim 9, wherein generating the nonce at the remotely accessed system comprises storing the identification information at the remotely accessed system and validating comprises verifying the identification information to determine if a packet is valid.

14. The method, as set forth in claim 9, wherein validating comprises accessing a database for the reference hash, wherein the reference hash comprises a second hash along with the nonce.

15. The method, as set forth in claim 9, wherein validating comprises accessing a database for the reference hash, and combining the reference hash with the nonce to validate the operation from the remote system.

16. The method, as set forth in claim 9, wherein validating comprises verifying the identification information.

17. The method, as set forth in claim 9, wherein generating the nonce at the remotely accessed system comprises storing the nonce at the remotely accessed system and validating comprises verifying the nonce in a packet.

18. A system comprising:
a first computer system, the first computer system comprising a first program for hashing information;
a request being generated from information received by the first computer system and hashed by the first program;
a network connected to the first computer system and adapted to receive the request;
a second computer system connected to the network and adapted to receive the request from the first computer system, wherein the second computer system comprises:
a processor;
a first section of memory operatively coupled to the processor, the first of section memory storing a file that is a hash; and
a second section of memory being configured to store a validation program initiated by the processor, the validation program having a validation routine configured to validate the file stored in the first section of memory against the received request; wherein if the received request is valid, the second computer system may execute a command that corresponds to the file.

19. The system, as set forth in claim 18, wherein the information comprises a command.

20. The system, as set forth in claim 19, wherein the information comprises a nonce.

21. The system, as set forth in claim 18, wherein the first computer system comprises a second program for digitally signing information.

22. The system, as set forth in claim 21, wherein the validation program compares the hash stored in the first section of memory against signed information in the received request.

23. The system, as set forth in claim 22, wherein the signed information comprises a signed command and signed argument.

* * * * *